United States Patent

[11] 3,617,591

[72] Inventors Kenneth C. Petersen, Scotia;
 Thomas M. Galkiewicz, Schenectady, both of New York
[21] Appl. No. 46,545
[22] Filed June 15, 1970
[45] Patented Nov. 2, 1971
 Continuation-in-part of application Ser. No. 873,059, Oct. 31, 1969. This application June 15, 1970, Ser. No. 46,545
[73] Assignee Schenectady Chemicals, Inc., Schenectady, New York

[54] HIGH TEMPERATURE RESISTANT POLYCHLOROPRENE ADHESIVE RESIN
 19 Claims, No Drawings
[52] U.S. Cl. .................................... 260/25, 27, 845, 846
[51] Int. Cl. ................................... C08g5/22

[50] Field of Search ............................ 260/25, 27, 845, 846

[56] References Cited
UNITED STATES PATENTS
2,938,876  5/1960  Morris ................... 260/25
3,198,760  8/1965  Widenour .............. 260/25

Primary Examiner—Hosea E. Taylor
Assistant Examiner—William E. Parker
Attorney—Cushman, Darby, and Cushman ABSTRACT: Superior polychloroprene adhesives are prepared by incorporating the reaction product of an alkali catalyzed alkyl phenol-formaldehyde resin and zinc resinate. Preferably an arylphenol and/or bisphenol A is also incorporated. Also preferably rosin is included in the composition. Other zinc compounds, e.g. zinc oxide, zinc borate, zinc phosphate, zinc carbonate, and zinc salicylate can be used in place of zinc resinate.

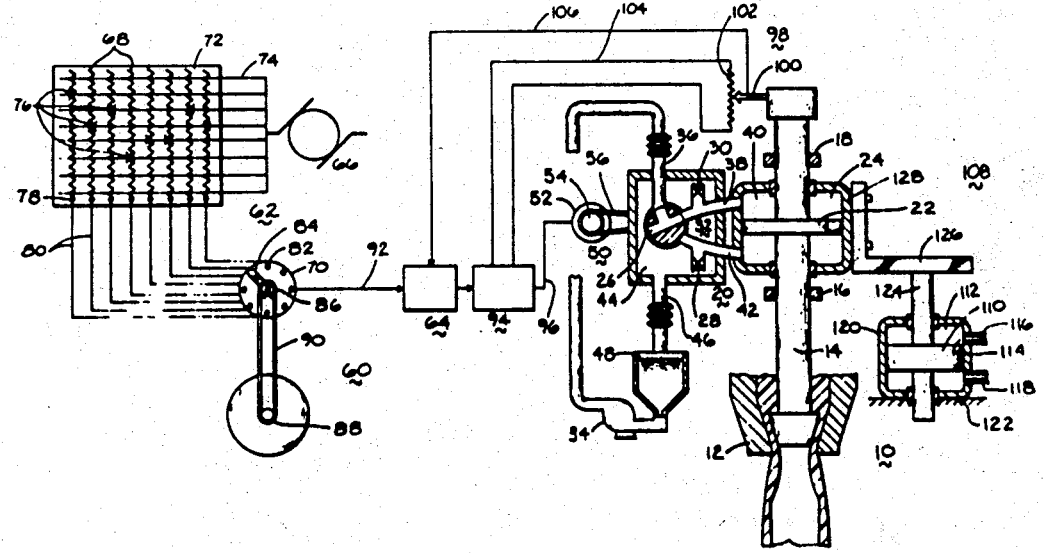

HIGH TEMPERATURE RESISTANT POLYCHLOROPRENE ADHESIVE RESIN

This application is a continuation in part of Application 873,059 filed October 31, 1969, now abandoned.

The present invention relates to neoprene adhesives.

It is an object of the invention to improve the properties of neoprene adhesives.

Another object is to increase the peel and shear stress resistance of neoprene adhesives at elevated temperatures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing an adhesive cement containing polychloroprene (neoprene) and the reaction product of an alkali catalyzed alkylphenol and/or arylphenol formaldehyde resin and zinc resinate. Rosin is preferably added as a processing aid and does not interfere with the excellent high temperature adhesion developed in neoprene adhesives utilizing the zinc resinate modified alkylphenol-formaldehyde resin of the present invention. There is also preferably employed a chlorophenol or arylphenol, e.g. p-phenylphenol, p-tolyphenol or alpha methyl styryl phenol and/or Bisphenol A as modifiers for the alkylphenol. The aryl phenol can be used by itself without an alkylphenol.

The alkylphenol is preferably a para substituted phenol in which the substituent is an alkyl group of 2 to 6 carbon atoms. The para substituted phenol is preferably p-t-butyl phenol but there can be employed p-t-amyl phenol, p-hexyl phenol, p-n-butyl phenol, p-cyclohexyl phenol, p-ethyl phenol, p-isopropyl phenol.

It has further been found that in place of zinc resinate in preparing the resins for incorporation into polychloroprene adhesives there can be used other zinc compounds such as zinc oxide, zinc carbonate, zinc borate, zinc salicylate and zinc phosphate for example. These resins impart exceptional properties to the polychloroprene adhesives in respect to high heat resistance.

There can be used as little as 0.3 mole of formaldehyde per mole of alkyl phenol or the like. Frequently there is employed 0.7 mole of formaldehyde and preferably 0.9 to 1.8 moles of formaldehyde are employed per mole of phenol.

The Bisphenol A (2,2-bis-(4'-hydroxyphenyl) propane) when employed is used in an amount of 2 to 8% based on the total phenols reacted.

When a chlorophenol or an arylphenol is employed in addition to the alkylphenol, it is employed in an amount of 5 to 70% of the total phenols.

The catalyst employed in forming the alkyl (or aryl) phenol formaldehyde resin is alkaline. There can be used any alkaline catalyst conventionally employed for such purpose, e.g. alkali metal hydroxides such as sodium hydroxide and potassium hydroxide, alkaline earth metal oxides and hydroxides, e.g. calcium oxide, calcium hydroxide, barium hydroxide and magnesium oxide, alkali carbonates, e.g. sodium carbonate and potassium carbonate, ammonium hydroxide, quaternary ammonium hydroxides, anion exchange resins, basic amines, e.g. triethanolamine.

The alkaline material can be neutralized with any conventional acid, e.g. hydrochloric acid, hydrobromic acid, oxalic acid, chloroacetic acid, phosphoric acid, etc.

The order of reacting the phenol, formaldehyde and zinc resinate or other source of zinc is not critical. The zinc resinate or other source of zinc is normally used in an amount of 5 to 75%, frequently 5 to 35% and most often in an amount of 7.6 to 18% based on the final resin. As little as 1% of zinc compound can be employed. The reaction with the zinc resinate or other source of zinc is carried out with heat usually terminating at 150 to 250° C. although other temperatures can be used. When rosin is employed, it is usually used in an amount of 20 to 45% of the phenols employed but can be used in lesser amounts down to zero.

The alkaline catalyzed phenol-formaldehyde resin is preferably from 60 to 90% of the total final resin.

Unless otherwise indicated, all parts and percentages are by weight.

While in the specific examples there was employed Neoprene AC (a nonsulfur modified chloroprene polymer stabilized with thiuram disulfide) there can be used other commercially available neoprenes such as Neoprene Type CG, Neoprene Type AD, Neoprene Type GN, and Neoprene W. These various neoprenes are described in Kell Patent 3,242,113.

There is employed 5 to 200 parts of the zinc resinate or other zinc compound reacted phenolic resin per 100 parts of neoprene (polychloroprene).

The adhesive cement also contains a volatile organic solvent. This solvent can be toluene, ethyl acetate, trichloroethylene, methyl ethyl ketone, hexane, acetone, benzene or mixtures of these materials. Suitable solvent mixtures for example are shown in the Garrett patent 3,185,658 column 3, lines 3-39.

There can also be included in the adhesive cement conventional neoprene additives such as zinc oxide and magnesium oxide and antioxidants such as Zalba-special (a hindered phenol composition coming within the disclosure and claims of U.S. Patent No. 2,999,841 and made of 45% hindered phenol, 45% sorbitol and 10% Microcell B (calcium silicate) the hindered phenol being largely 2,6-di-t-butyl-p-phenyl phenol with smaller amounts of isomeric impurities and a small amount of 2,4'6-tri-t-butyl phenyl phenol) and other hindered phenols, e.g. 2,6-di-t-butyl-4-phenylphenol, p-methyl-o-t.-butyl methylene bis-phenol, 2,2'-methylenebis (4-methyl-6-t-butyl phenol), as well as amines, e.g. Neozone D (N-phenyl-B-naphthylamine) N-phenyl a-naphthylamine, etc.

EXAMPLE 1

900 grams of xylene, 15.6 grams of Bisphenol A, 283 grams of p-phenylphenol, 500 grams of p-t-butyl phenol, 50 grams of methanol and 529 grams of 37% aqueous formaldehyde were loaded into a glass flask set up for atmospheric reflux. The mixture was heated to 55° C., then 75 grams of 50% aqueous sodium hydroxide was added and the batch was brought to reflux and held for 45 minutes. The reaction mixture was then cooled by adding 500 grams of water. The pH of the resin was then brought to 1 by the addition of 165-170 grams of 20% aqueous hydrochloric acid. The neutralized condensate was agitated for a while, then the layers were allowed to separate. The water layer was decanted and the resin was washed twice more with 500 parts each time of water to remove sodium chloride.

The flask was then set up for distillation and there were added 285 grams of wood rosin and 9 grams of 85% phosphoric acid. The resin was distilled at atmospheric pressure to approximately 150° C. There were then added 135 grams of Unirez 1028 (zinc resinate) and distillation was continued to 215° C. Full vacuum was applied and the distillation was continued to 225° C. The resin was then poured out of the flask to cool. The yield was 1260 grams, M.P. 315° F., molecular weight, 1705.

This thermoplastic resin developed in neoprene adhesives extraordinary resistance to peel and shear stresses at elevated temperatures. It also imparted phase resistance to neoprene adhesives compounded therefrom.

EXAMPLE 2

This adhesive formulation was prepared to evaluate the product of example 1.

Part A

| | |
|---|---|
| Neoprene AC | 100 parts |
| Zinc Oxide | 5 " |
| Magnesium Oxide | 4 " |
| Zalba Special | 2 " |

The above ingredients were mixed on a cold roll mill, then the compounded elastomer was cut into chunks and dissolved in 333 parts of toluene.

Part B

| | |
|---|---|
| Resin produced in example 1 | 45.0 parts |
| Magnesium Oxide | 4.5 " |
| Water | 2.0 " |
| Toluene | 47.5 " |

The above ingredients were placed in a pint can and rolled overnight at room temperature to prereact the resin.

Parts A and B were then blended together to form the finished adhesive composition.

The adhesive was then tested for shear strength when bonding cotton duck to an alkyd painted panel. The shear strength was tested at room temperature, 158° F. and 250° F.

Below are recorded the maximum shear values obtained, along with a control adhesive which contains SP-134, a conventional heat reactive phenolic resin made from p-t-butylphenol, Bisphenol A and formaldehyde (M.P. Cap. = 160° F.) compounded exactly as the above adhesive.

| Condition | SP-134, psi | Resin of Example 1, psi |
|---|---|---|
| Room Temp. | 105 | 115 |
| 158° F. | 45 | 54 |
| 250° F. | 12 | 49 |

EXAMPLE 3

A mixture of xylene 900 g., Bisphenol A 15.6 g., p-phenylphenol 283 g., p-t-butylphenol 500 g., 37% formaldehyde 480 g. and methanol 50 g. was brought to 55° C. Then 75 g. of 50% sodium hydroxide was added. The temperature was brought to reflux and held for ½ hour. The batch was then neutralized with 168 g. 20% hydrochloric acid. The resin was then washed twice with water as in example 1.

Three grams of 85% phosphoric acid, and three hundred grams of wood rosin were added and the mixture was heated to 150° C. while atmospherically distilling off volatiles. Zinc resinate 114 g. was then added and the mixture was brought to 190° C., held ½ hour, then poured into a pan to cool, yielding 1269 g. of a homogeneous resin. M.P. Cap. = 300° F.

EXAMPLE 4

A mixture of 300 g. of xylene, 5.2 g. of Bisphenol A, 94 g. of p-phenylphenol, 166 g. of p-t-butylphenol, 160 g. of 37% uninhibited formaldehyde, 107 g. of wood rosin and 38 g. of zinc resinate was heated to 60° C. At this temperature 8 grams of 50% sodium hydroxide were added.

The temperature was brought to reflux and held for approximately 3 hours. The resin was then distilled to 191° C. and poured into a pan to cool, yielding 427 g. of a resin melting at 280° F.

EXAMPLE 5

A mixture of 300 g. of xylene, 5.6 g. of Bisphenol A, 118 g. of alpha methylstyryl phenol, 166 g. of p-t-butylphenol, 16 g. of methanol, 140 g. of 37% formaldehyde was heated to 55° C. 27 g. of 50% aqueous sodium hydroxide was added and the mixture was heated to reflux. The reaction was maintained at reflux for 40 minutes. The resin was then neutralized, with 59.4 gms. of 20% hydrochloric acid. The resin was then washed twice with water. Eighty grams of wood rosin was then added and the mixture heated to 150° C. under atmospheric distillation. Thirty-eight grams of Zinc Resinate (Unirez 1028) was added and heating was continued to 190° C. The resin was then poured into a pan to cool. Yield = 410 g., Melting Point (Cap) = 260° F.

EXAMPLE 6

A mixture of 300 g. of xylene, 5 g. of Bisphenol A, 70 g. of p-chlorophenol, 166 g. of p-t-butylphenol, 13 g. of methanol, 160 g. of 37% uninhibited formaldehyde was heated to 55° C., then 25 g. of 50% sodium hydroxide was added. The temperature was brought to reflux and held at this temperature for 50 minutes. The mixture was neutralized with 77 g. of 20% hydrochloric acid. The resin was then washed twice with water. One gram of 85% phosphoric acid and 90 g. of wood rosin were added and the temperature was brought to 156° C. Thirty-eight g. of zinc resinate was then added and the temperature was brought to 205° C. The resin was then poured into a pan to cool. Yield = 379 g., Melting Point (Cap) = 304° F.

EXAMPLE 7

A mixture of 300 g. of xylene, 94 g. of p-phenyl-phenol, 166 g. of p-t-butylphenol, 13 g. of methanol, 160 g. of 37% formaldehyde was heated to 55° C. then 25 g. of sodium hydroxide was added. The temperature was brought to reflux and held for 38 minutes. The reaction product was then neutralized with 78.1 g. of 20% hydrochloric acid. The resin was then washed twice with water.

One gram of 85% phosphoric acid and 107 g. wood rosin was added and the mixture was distilled to 150° C. Thirty-eight g. of Unirez 1028 (Zinc Resinate) was added and the reaction was continued to 205° C. The resin was then poured into a pan to cool. Yield = 417 g., M.P. (Cap) = 308° F.

EXAMPLE 8

A mixture of 900 g. of xylene, 15.6 g. of Bisphenol A, 283 g. of p-phenylphenol, 500 g. of p-t-butylphenol, 50 g. of methanol, 496 g. of 37% formaldehyde was heated to 55° C. then 75 g. of 50% sodium hydroxide was added and the mixture was brought to reflux. Reflux was held for 45 minutes. The mixture was then neutralized with 184 g. of 20% hydrochloric acid. The resin was washed twice with water. Nine g. of 85% phosphoric acid was added and heat was applied to 144° C. under distillation conditions. Zinc Resinate (Unirez 1014), 114 g. was added and distillation was continued to 187° C. The resin was then poured into a pan to cool. Yield = 1047 g. M.P. (Cap) = 290° F.

The resins set forth in examples 3-8 were employed in place of the resin of example 1 in the adhesive formula of example 2 with the following results in the shear strength test.

| Example | 250° F. Shear Strength |
|---|---|
| 3 | 57 psi |
| 4 | 63 psi |
| 5 | 34 psi |
| 6 | 35 psi |
| 7 | 53 psi |
| 8 | 59 psi |

It can be seen that the resins of the present invention are much superior in their ability to promote elevated temperature adhesion in polychloroprene adhesives than conventional adhesive resins such as SP-134.

EXAMPLE 9

To show that a simple mixture of zinc resinate and alkyl phenoformaldehyde resin did not exhibit the high temperature adhesion exhibited by the resins of the present invention in chloroprene adhesives the following experiment was carried out.

A mixture of xylene 900 g. Bisphenol A, 15.6 g., p-phenylphenol 283 g., p-t-butylphenol, 500 g., methanol 50 g., 37% uninhibited formaldehyde, 480 g. was heated to 52° C., then 75 g. of 50% sodium hydroxide was added. The temperature was brought to reflux. The temperature was held for approximately one hour. The resin was then neutralized with 187 g. of 20% hydrochloric acid. The resin was washed twice. Four g. of 85% phosphoric acid was added. The temperature was then brought to 165° C. and the resin was poured into a pan to cool. Yield = 1330 g., M.P. (Cap) = 200° F.

The following pulverized mixtures were prepared by grinding in a mortar:

| Component | 9(a) | 9(b) | 9(c) | 9(d) |
|---|---|---|---|---|
| Unirez 1028 | 0 parts | 14 parts | 0 parts | 10 parts |
| Wood rosin | 0 " | 28 " | 28 " | 0 " |
| Resin of Example 9 | 100 " | 100 " | 100 " | 100 " |

Each of the formulations of examples 9(a), 9(b), 9(c), and 9(d) was employed in the place of the resin of example 1 in the adhesive of example 2 with the following results in the shear strength test.

| Example | 250° F. Shear Strength |
|---|---|
| 9(a) | 12 psi |
| 9(b) | 22 psi |
| 9(c) | 8 psi |
| 9(d) | 10 psi |

It will be observed that the 250° F. adhesion values are very poor compared to the reacted materials employed in the present invention.

EXAMPLE 10

900 grams of xylene, 283 grams (1.66 moles) of p-phenylphenol, 15.6 grams (0.066 mole or 0.132 equivalent) of Bisphenol A, 500 grams (3.33 mole) of p-t-butylphenol, 50 grams of methanol and 165 grams (2 moles) of 37% aqueous formaldehyde were loaded into a 5 liter flask set up for reflux. At 50° C. 25 grams of 50% aqueous sodium hydroxide were added, the temperature was then brought to reflux and held for 30 minutes. Then 350 grams of water were added and next 50 ml. of 20% aqueous HCl to neutralize the sodium hydroxide. The batch was brought to 80° C. and 900 grams of Unirez 1028 added. The resin was then distilled at 23 inches of vacuum to 190° C. and poured. The yield was 1686 grams, M.P. (Capillary) 170° F.

EXAMPLE 11

900 grams of xylene, 283 grams of p-phenylphenol, 15.6 grams of Bisphenol A, 500 grams of p-t-butylphenol, 50 grams of methanol and 331 grams (4.0 moles) of 37% aqueous formaldehyde were loaded into a 5 liter flask set up for reflux. At 45° C. 25 grams of 50% aqueous sodium hydroxide were added, the temperature was then brought to reflux and held for 10 minutes. Then 350 grams of water were added as well as 50 ml. of 20% aqueous HCl. The resin was allowed to settle, the water layer siphoned off and 2100 grams of Unirez 1028 were added at 140° C. during an atmospheric distillation. The temperature was brought to 180° C. and then 20 inches of vacuum was applied and distillation was continued to 210° C. The resin was then poured into a pan to cool. The yield was 2826 grams, M.P. (Capillary) 250° F.

EXAMPLE 12

The resins prepared in examples 10 and 11 were employed in place of the resin of example 1 and the neoprene adhesive formula of example 2 with the following results in the shear strength test.

| Example | 250° F. Shear Strength |
|---|---|
| 10 | 28 psi |
| 11 | 35 psi |

Thus they had shear strength properties similar to those of examples 5 and 6 and were superior to the conventional adhesive resins such as SP-134.

EXAMPLES 13–16

The formulations employed were as follows. The amounts were in grams.

| | Formulation | Examples | | | |
|---|---|---|---|---|---|
| | | 13 | 14 | 15 | 16 |
| A | Xylene | 900 | 900 | 900 | 900 |
| B | p-phenylphenol | 283 | 283 | 283 | 283 |
| C | p-t-butylphenol | 500 | 500 | 500 | 500 |
| D | Bisphenol A | 15.6 | 15.6 | 15.6 | 15.6 |
| E | Methanol | 50 | 50 | 50 | 50 |
| F | 37% formaldehyde | 415 | 415 | 415 | 365 |
| G | 50% sodium hydroxide | 75 | 75 | 75 | 75 |
| H | Water | 350 | 350 | 350 | 350 |
| I | 20% hydrochloric acid | 170 | 170 | 170 | 170 |
| J | Water | 500 | 500 | 500 | 500 |
| K | Water | 500 | 500 | 500 | 500 |
| L | 85% H$_3$PO$_4$ | 3.0 | 3.0 | 3.0 | 3.0 |
| M | Zinc Salicylate | 75 | | | |
| M | Zinc Borate | | 126 | | |
| M | Zinc Phosphate | | | 42 | |
| M | Zinc Oxide | | | | 15 |

Procedure

Materials A–F were loaded into a 5 liter flask set up for reflux. The temperature was brought to 50° C. Then G was added and the temperature brought to reflux and held for one hour. The batch was cooled to 80° C. and acidified with I to a pH of 3.0. The mixture was agitated for 0.5 hour and the two layers were allowed to separate. The aqueous phase was decanted. The resin phase was washed first with J and then with K. Material L was added and the resin was distilled to 150° C. Material M was then added and distillation was continued to the following temperatures. The resins were then poured into a pan to cool.

| Example | 13 | 14 | 15 | 16 |
|---|---|---|---|---|
| Final Distillation Temperature | 210° C. | 200° C. | 215° C. | 290° C. |
| Melting Point (Capillary) | 320° F. | 290° F. | 280° F. | 278° F. |

EXAMPLE 17

The resins prepared in examples 3–16 were employed in place of the resin of example 1 in the neoprene adhesive formula of example 2 with the following results in the shear strength test.

| Example | 250° F. Shear Strength |
|---|---|
| 13 | 59 psi |
| 14 | 21 psi |
| 15 | 33 psi |
| 16 | 32 psi |

EXAMPLE 18

This example illustrates the use of another zinc compound to replace zinc resinate.

| Formulation | | Amount |
|---|---|---|
| A | Xylene | 900 grams |
| B | p-phenylphenol | 283 g. |
| C | Bisphenol A | 15.6 g. |
| D | Methanol | 50 g. |
| E | p-t-butylphenol | 500 g. |
| F | 37% formaldehyde | 480 g. |
| G | 50% sodium hydroxide | 75 g. |
| H | Water | 350 g. |
| I | 20% HCl | 155 ml. |
| J | Water | 500 g. |
| K | Water | 500 g. |
| L | 85% $H_3PO_4$ | 3 g. |
| M | Wood Rosin | 321 g. |
| N | Zinc carbonate (basic) ($ZnCO_3 \cdot Zn(OH)_2$) | 30 g. |

Materials A–F were loaded into a 5 liter flask set up for reflux. The temperature was brought to 50° C. and G was added. The temperature was brought to reflux and held for 0.5 hour. Material H and I were added and the temperature then brought to 80° C. The mixture was agitated for 0.5 hour and then the aqueous phase was decanted. The resin solution was washed first with material J and then with material K. The resin was then acidified with L and M was added. The resin was distilled atmospherically to 140° C. and then N was added and distillation was continued to 220° C. and held for 20 minutes.

The batch was then poured into a pan to cool. The product had a melting point (capillary) of 290° F. and a molecular weight of 1155. In the shear strength test at 250° F. in the neoprene formulation of example 2 the adhesive had a 36 psi tensile shear value. This was much superior to a conventional phenolic heat reactive resin which usually runs about 10 psi.

We claim:

1. An adhesive composition comprising a polymer of chloroprene and the heat reaction product of zinc resinate and an alkaline condensed alkyl or aryl substituted phenol-formaldehyde resin.

2. An adhesive composition according to claim 1 wherein the phenol is a para alkyl substituted phenol.

3. An adhesive composition according to claim 2 wherein the alkyl group has 3 to 6 carbon atoms.

4. An adhesive composition according to claim 1 comprising 100 parts of the chloroprene polymer and 5 to 200 parts of the zinc resinate reacted phenol formaldehyde resin.

5. An adhesive composition according to claim 4 wherein the phenol formaldehyde resin contains at least 0.7 mole of formaldehyde per mole of phenol and the zinc resinate is used in an amount of 5 to 35% based on the final resin.

6. An adhesive composition according to claim 5 wherein the phenol formaldehyde resin is a para alkylphenol formaldehyde resin having a part of the alkylphenol replaced by a member of the group consisting of arylphenols, chlorophenol and 2,2-bis-(4′-hydroxyphenol) propane wherein the heat reaction in preparing the zinc resinate-phenol formaldehyde product was terminated at a temperature between 150° C. and 250° C.

7. An adhesive composition according to claim 6 including rosin.

8. An adhesive composition according to claim 5 wherein the phenol formaldehyde resin contains at least 0.3 mole of formaldehyde per mole of phenol and the zinc resinate is used in an amount of 5 to 75% based on the final resin.

9. An adhesive composition according to claim 8 wherein the phenol formaldehyde resin is a p-alkylphenol formaldehyde resin having 2 to 70% of the alkylphenol replaced by a member of the group consisting of arylphenols, chlorophenol and 2,2-bis-(4′-hydroxyphenyl) propane and wherein the heat reaction in preparing the zinc resinate-phenol formaldehyde product was terminated at a temperature between 150° C. and 300° C.

10. An adhesive composition according to claim 9 including rosin.

11. An adhesive composition comprising a polymer of chloroprene and the heat reaction product of a zinc compound selected from the group consisting of zinc resinate, zinc oxide, zinc carbonate, zinc borate, zinc salicylate and zinc phosphate, and an alkaline condensate alkyl or aryl substituted phenol-formaldehyde resin.

12. An adhesive composition according to claim 11 wherein the zinc compound is a zinc compound other than zinc resinate.

13. An adhesive composition according to claim 11 wherein the zinc compound is selected from the group consisting of zinc oxide, zinc borate, zinc phosphate, zinc salicylate and basic zinc carbonate.

14. An adhesive composition according to claim 11 wherein the phenol is a para alkyl phenol.

15. An adhesive composition according to claim 14 wherein the alkyl group has 3 to 6 carbon atoms.

16. An adhesive composition according to claim 11 comprising 100 parts of the chloroprene polymer and 5 to 200 parts of the zinc compound reacted phenol-formaldehyde resin.

17. An adhesive composition according to claim 16 wherein the phenol formaldehyde resin contains at least 0.3 mole of formaldehyde per mole of phenol and the zinc compound is used in an amount of 0.5 to 75% based on the final resin.

18. An adhesive composition according to claim 17 wherein the zinc compound is selected from the group consisting of zinc oxide, zinc borate, zinc phosphate, zinc salicylate and zinc carbonate.

19. A composition according to claim 18 including rosin in an amount of 20 to 45% of the phenols employed.

* * * * *

UNITED STATES PATENT OFFICE
CERTIFICATE OF CORRECTION

Patent No. 3,617,591        Dated November 2, 1971

Inventor(s) Kenneth C. Petersen and Thomas M. Galkiewicz

It is certified that error appears in the above-identified patent and that said Letters Patent are hereby corrected as shown below:

Delete the drawing

Col. 6 (in Example 17), line 72, "3-16" should be --13-16--.

Signed and sealed this 3rd day of July 1973.

(SEAL)
Attest:

EDWARD M. FLETCHER, JR.      Rene Tegtmeyer
Attesting Officer             Acting Commissioner of Patents